United States Patent
Sugaya

(10) Patent No.: US 7,382,798 B2
(45) Date of Patent: Jun. 3, 2008

(54) RADIO COMMUNICATION SYSTEM, RADIO COMMUNICATION DEVICE, RADIO COMMUNICATION METHOD AND COMPUTER PROGRAM

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 884 days.

(21) Appl. No.: 10/760,508

(22) Filed: Jan. 20, 2004

(65) Prior Publication Data

US 2004/0152464 A1   Aug. 5, 2004

(30) Foreign Application Priority Data

Jan. 23, 2003   (JP)   ............................ P2003-014247

(51) Int. Cl.
*H04B 7/212* (2006.01)
(52) U.S. Cl. ..................... 370/443; 455/435.2; 455/443
(58) Field of Classification Search ................ 370/908, 370/443, 255; 455/443, 435.2
See application file for complete search history.

(56) References Cited

U.S. PATENT DOCUMENTS

| | | | | |
|---|---|---|---|---|
| 5,301,357 A | * | 4/1994 | Thompson | ............... 455/435.2 |
| 5,577,168 A | * | 11/1996 | Haas et al. | .................. 455/443 |
| 7,120,129 B2 | * | 10/2006 | Ayyagari et al. | ............ 370/255 |
| 2003/0063619 A1 | * | 4/2003 | Montano et al. | ............ 370/443 |

* cited by examiner

*Primary Examiner*—Chi Pham
*Assistant Examiner*—Albert T. Chou
(74) *Attorney, Agent, or Firm*—Lerner, David, Littenberg, Krumholz & Mentlik, LLP

(57) ABSTRACT

A wireless ad hoc network is established so that communication terminals performing random access do not interfere with one another. A radio communication device grasps the existence of a surrounding radio communication device using a predetermined method, and when a new radio communication device is detected, an authentication verification operation of the new radio communication device is performed. When the authentication is successful, the new radio communication device is registered in a neighbor connection list. If the authentication fails, it is registered in a neighbor non-connection list. As a result, the wireless ad hoc network can be established without having the radio communication devices sharing the same space interfering with one another.

19 Claims, 9 Drawing Sheets

F I G. 1 1
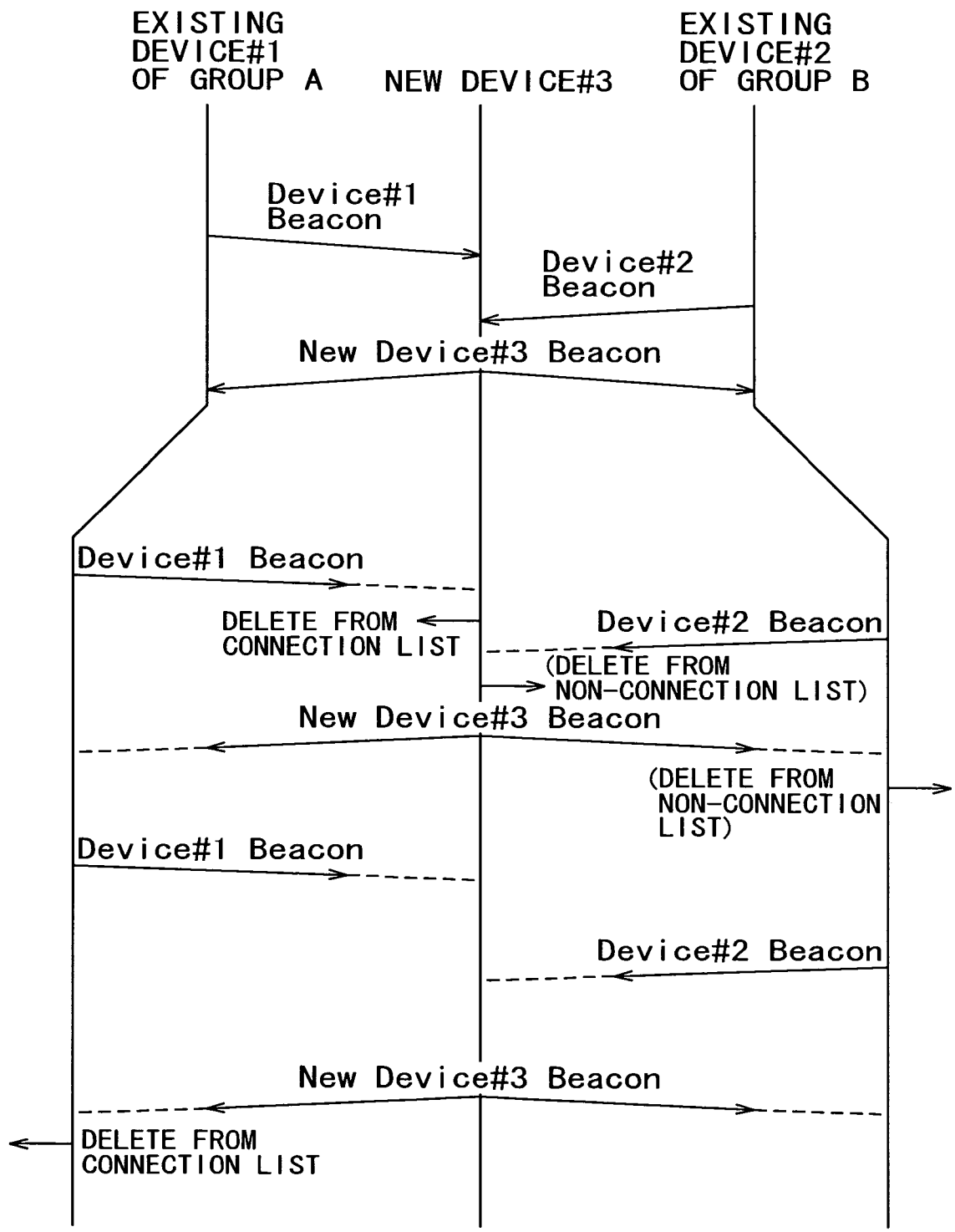

RADIO COMMUNICATION SYSTEM, RADIO COMMUNICATION DEVICE, RADIO COMMUNICATION METHOD AND COMPUTER PROGRAM

CROSS REFERENCE TO RELATED APPLICATIONS

The present document is based on Japanese Priority Application JP2003-014247 filed in the Japanese Patent Office on Jan. 23, 2003, the contents of which being incorporated herein by reference to the extent permitted by law.

BACKGROUND OF THE INVENTION

1. Field of the Invention

The present invention relates to a radio communication system, a radio communication device and a radio communication method for mutual communication among a plurality of radio stations such as a wireless LAN (Local Area Network), and a computer program for implementing the method, and in particular to a radio communication system, a radio communication device and a radio communication method for a radio network in which terminals asynchronously and directly communicate with one another, and a computer program for implementing the method.

More particularly, the present invention relates to a radio communication system, a radio communication device, and a radio communication method in which a radio network is established by ad hoc (Ad-hoc) communication without particularly arranging a device as a control station, and a computer program for implementing the method, especially to a radio communication system, a radio communication device, and a radio communication method in which communication terminals performing random access may not interfere one another among networks under a communication environment where a plurality of ad hoc networks adjoin one another, so as to form a radio network, and a computer program for implementing the method.

2. Description of the Related Art

As a system which releases a user from LAN wiring by means of cables, the wireless LAN has attracted attention. According to the wireless LAN, most wiring cables may be omitted in working spaces such as an office, so that the communication terminals such as a personal computer (PC) can be moved comparatively easily.

In recent years, as wireless LAN systems have improved in speed and cost, their demands have remarkably increased. In particular, in order to establish a small-scale radio network among a plurality of electronic devices existing in the environments and to perform information communications, an introduction of a personal area network (PAN) has been considered. Different radio communication systems are defined by means of frequency bands which do not need any license from the controlling authorities, such as for example, 2.4 GHz band, and 5 GHz band.

In order to constitute a local area network using wireless technologies, it is usual to employ a method in which one device as a control station called an "access point" is provided in the area, so that the network is established under the general control of the control station.

In the radio network having an access point, when information is transmitted from a certain communication device, an access control method based on bandwidth reservation is widely employed in which a bandwidth required for the information transmission is first reserved to an access point so that a transmission channel may be used to avoid a collision with information transmission of another communication device. In other words, by arranging the access point, synchronized radio communications may be carried out in which the communication devices in the radio network synchronize with one another.

However, when asynchronous communication between the communication devices on a transmission side and a reception side are carried out in the radio communication system in which the access point is detected, the wireless communication through the access point is always required, so that there is a problem that performance of the transmission channel is considerably reduced.

In contrast, as another method of constituting the radio network, a so-called "ad hoc (Ad-hoc) communication", in which the terminals communicate with one another directly and asynchronously by radio has been proposed. Amongst these, in a small-scale radio network constituted by a comparatively small number of clients located in proximity, it is considered that the ad hoc communication is appropriate in which arbitrary terminals can mutually perform the direct and asynchronous wireless communication without using a specific access point.

On the other hand, nowadays, a method called "ultra wideband (UWB) communication" which puts information on a very weak impulse train and performs wireless communication has received attention as a radio communication system which allows short-distance ultra high-speed transmission, and such method is expected to be realized (see "Ultra Wideband, Delivering Child of Revolution in Radio Communications," Nikkei Electronics 11 Mar. 2002, pp. 55-66, for example).

There are two types of UWB transmission systems. One is a DS-UWB system in which a spread rate of an information signal of DS (direct sequence) is increased to the maximum. The other is an impulse-UWB system in which an information signal is constituted by using an impulse signal train of very short period, approximately a few hundred pico seconds so that the signal train may be transmitted and received. Both systems spread the signal train over an ultra wide frequency band of 3 GHz through 10 GHz, for example, so as to transmit and receive the signal trains and realize high-speed data transmission. The occupied bandwidth is on the order of GHz such that a quotient of the occupied bandwidth divided by its center frequency (for example, 1 GHz-10 GHz) is substantially 1 (one), and therefore the bandwidth is wider than those which are usually used in the so-called W-CDMA system, the so-called CDMA2000 system, as well as a wireless LAN using the SS (Spread Spectrum) system or the OFDM (Orthogonal Frequency Division Multiplexing) system.

For example, in the standardization process of IEEE 802.15.3, a method of communicating by forming a piconet among radio communication devices which perform ultra wideband wireless communication, for example, is being standardized.

Now, considering that information devices, such as a personal computer (PC), become popular and there is a communication environment where many devices are mixed in an office and the devices are connected to one another by means of the radio network, two or more radio networks may be crushed within a small operation space so that their communication service areas may overlap with one another.

Under such a wireless communication environment, one radio network uses a certain frequency channel and other radio networks use different frequency channels, so that they can coexist even if they overlap with one another in space.

However, in a wireless ad hoc network system, since a network is (i.e. not via the control station) established simply between a radio communication device and another radio communication device within its own service area (distance) in the same frequency channel, it is difficult for them to coexist by means of different frequency channels. For example, when expanding ad hoc radio networks within a predetermined space domain, a radio communication device installed in an area which overlaps an adjoining ad hoc radio network can communicate with a radio communication device included in another ad hoc network. Therefore, the radio communication device might repeat an unnecessary authentication process with a radio communication device outside its network.

The UWB transmission system (as mentioned above) expected as a radio communication system for realizing short-distance ultra high-speed transmission performs high-speed data transmission by spreading a transmission data in a very wide frequency band, so that it is quite likely to overlap an adjoining wireless communication network and it is difficult to realize the coexistence by means of the different frequency channels.

Alternatively, a plurality of radio networks may coexist by performing the time division multiplexing with respect to one frequency channel to be utilized, even if the networks spatially overlap one another.

For example, a communication system is envisaged in which a plurality of radio communication devices are grouped, a representative wireless communication terminal is provided for each group, the representative wireless communication terminal specifies time to be used in the group, and a beacon signal is transmitted so as to notify another terminal in the group and an adjoining representative wireless communication terminal in another group (see Japanese Laid Open Patent 2000-165930, for example).

However, when the method in which the representative wireless communication terminal thus specifies the time to be used within the group is employed, the representative wireless communication terminal in the group is specified in advance, which can be a problem that it should be notified to all the wireless communication terminals in the group. Therefore, it may not be applied to the ad hoc network in which the wireless communication terminals operate on an equal basis, and the terminals in the service area are asynchronously and directly connected to one another.

When another group approaches an adjoining area, the surrounding groups need a process for synchronizing one another, which can be a problem that operations become complicated in an environment where many groups exist.

On the other hand, a network system is proposed in which a transmission frame is divided into a plurality of slots, at least one of which is assigned to a control slot so that information is transmitted suitable as a network status or content of information to be transmitted (see Japanese Laid Open Patent 2000-299670, for example). Each terminal station informs the control station of the transmission slot which is being interfered, so that the control station avoids the transmission slot and uses another transmission slot.

However, in this case, when a specific control station is established in each network, if the synchronization is not achieved among networks via the control station, the slot can not be avoided so as to use another transmission slot continuously. In other words, the network system can not be applied to the ad hoc network system in which any specific control station is provided.

In the case of the UWB transmission system as described above, since the impulse signal train to be used does not have a specific frequency carrier, it is difficult to perform career sensing. Therefore, when a UWB radio communication system is applied as a PHY layer of IEEE802.15.3, as a specific carrier signal does not exist, the access control of the section may not be performed by using the standardized carrier sensing and there is no other way but to depend on access control by means of the time division multiplexing system.

According to the standard IEEE802.15.3, a mechanism which makes neighboring piconets coexist is proposed by devising the time division multiplexing process. As the standard IEEE802.15.3, a structure is envisaged in which a plurality of networks are synchronized so as to perform the time division multiplexing, for example (see Japanese Laid Open Patent 2003-143644, for example).

In this case, as to each radio network, the control station (coordinator) assigns a band to each predetermined transmission frame period. Then, on receiving beacon information from another network, the network control station decodes the beacon information, sets up its band allocation area (time domain) as an unused domain in its network, based on the bandwidth allocation information written there. Further, the band allocation domain (time domain) used in another network is excluded, so that the band allocation area (time domain) used in its network can be set up again. As a result, while performing a network operation on a mutually equal basis, each of the radio networks may avoid a collision with other networks, to thereby realize the coexistence on the same frequency channel.

However, also in this case, networks coexist in the same frequency channel, so that it is necessary to achieve the time synchronization among the networks. In other words, since the system cannot be managed if the synchronization is not achieved among networks via the control station, so that it may not be applied to the ad hoc network system which does not prepare any specific control station.

SUMMARY OF THE INVENTION

The present invention aims to provide a radio communication system, a radio communication device, a radio communication method in which terminals asynchronously and directly communicate one another so that a radio network is suitably managed, and a computer program for implementing such method.

The present invention further aims to provide a radio communication system, a radio communication device, a radio communication method in which a plurality of radio networks constituted by ad hoc communication can suitably coexist without particularly arranging a device as a control station, and a computer program for implementing the method.

The present invention further aims to provide a radio communication system, a radio communication device, a radio communication method in which communication terminals performing random access do not interfere with one another in networks under a communication environment where a plurality of ad hoc networks adjoin one another, so as to form a suitable radio network, and a computer program for implementing the method.

The present invention has been conceived in view of the above, and a first preferred embodiment thereof includes a radio communication system in which a plurality of radio networks adjoin one another and service areas overlap with one another, in which each radio communication device has a connection list for registering a communication device to be connected with itself and a non-connection list for registering a communication device which is not connected with itself; the radio communication device grasps the existence of a surrounding radio communication device by a predetermined method; when a new radio communication device is detected, it performs an authentication verification operation with the new radio communication device; when the authentication is successful, the new radio communication device is registered in the connection list; and if the authentication fails, it is registered in the non-connection list.

However, what is meant by "system" in the present disclosure designates an aggregation in which a plurality of devices (or functional modules which realizes a specific function) are gathered logically, regardless of whether devices and functional modules are included in a single casing.

In the wireless communication environment as described in the present disclosure, wireless ad hoc networks are adjoined and each radio communication device within performs direct communication asynchronously by means of ad hoc communication, without providing a specific device as a control station.

In the radio communication system according to a first preferred embodiment of the present invention, in order to perform time division multiplex of one frequency channel and to establish a wireless ad hoc network system, radio communication devices which are permitted to communicate with radio communication devices which establish the network are registered in a connection list as the same group by means of a predetermined authentication process; the radio communication devices which can communicate are identified; the radio communication device which are not permitted to communicate are registered in a non-connection list in a different group; referring to the lists, a wireless communication network is managed and maintained.

In particular, prior to the predetermined authentication process, the radio communication device transmits the beacon signal at the head of its frame period in order to find another radio communication device existing in its own service area. Further, it performs a continuous reception process of a frame period at a predetermined period so as to find a surrounding radio communication device.

Then, according to the authentication process, radio communication devices included in the same group are registered in the connection list. Between the present radio communication device and those radio communication devices, access control is performed based on mutual beacon signals, and data transmission is performed. Radio communication devices which are not included in the same group are registered in the non-connection list, and the present radio communication device and those radio communication devices mutually receive the beacon signals so as to avoid a disturbance to the access control but not to perform either the data communication or another authentication process.

In other words, the radio communication devices in the same group are in the situation where they can recognize and communicate with one another, however, the radio communication devices of different groups are not to communicate even if they recognize one another, whereby mutual interferences among different wireless ad hoc networks can be avoided.

The radio communication device which operates in the radio communication system according to the first preferred embodiment of the present invention includes: a communication means for communicating radio data; a control means for controlling the communication operation of the radio data based on the communication means; a notification means for notifying its own existence within a service area of the communication means; a terminal detection means for detecting existence of another radio communication device within the service area of the communication means; and a connection management means for managing connection/non-connection with the other radio communication device whose existence has been detected in the service area.

The notification means can notify the existence of the present radio communication device by transmitting the beacon signal at a predetermined frame period by means of the communication means. Further, the terminal detection means can grasp the existence of another radio communication device by receiving the beacon signal from the communication means.

By receiving the beacon signal from the radio communication devices in this way, access control information can easily be exchanged with a connectable radio communication device.

Further, the connection management means carries out the authentication verification operation with respect to the radio communication device whose existence has newly been found by the terminal detection means. If the authentication is successful, the new radio communication device is registered in the connection list. If the authentication fails, it is registered in the non-connection list.

At this stage, the connection management means performs the authentication verification operation with respect to one that is registered in neither the connection list nor the non-connection list among the radio communication devices whose existence has been found by means of the terminal detection means, but does not perform the authentication verification operation with respect to one that is registered in the non-connection list. Thus, since it is possible to omit unnecessary authentication operations, drive power consumption of the device can be reduced, and the mutual interferences can be avoided between the adjacent ad hoc networks whose service areas overlap.

The authentication verification operation can be carried out in such a way that the radio communication device which has received the beacon signal and found a new device transmits an authentication request command. In response to this, the found (detected) radio communication device (transmitter of the beacon signal) sends back an authentication completion command. In other words, the connection management means may transmit the authentication request command to a radio communication device which is desired to be connected. When receiving the authentication request command from another radio communication device and accepting the authentication, it may register the other radio communication device with the connection list, and send back the authentication completion command.

When the authentication request command is received from another radio communication device, the connection management means may determine whether or not to accept the authentication through a device user's confirmation. In other words, on detecting a surrounding radio communication device such as receiving the authentication request command etc., the radio communication device may display an input window as a popup window on a display screen, for example, so as to ask the user for a determination as to whether or not to connect with this device.

The connection management means may delete, from the connection list, one whose existence is not recognized for more than a predetermined time by the terminal detection means among the radio communication devices registered in the connection list. Further, it may delete, from the non-connection list, one whose existence is not recognized for more than the predetermined time by the terminal detection means among the radio communication devices registered in the non-connection list.

When the existing radio communication device disappears from the service area in this way, the connection management can easily be performed by deleting it from the connection list or the non-connection list. Alternatively, when the existing radio communication device disappears, it may only be deleted from the connection list and a reauthentication process does not have to be carried out with respect to a radio communication device written in the non-connection list.

In addition, the radio communication device may prepare a reception domain immediately after transmission of the beacon signal for notifying its own existence, and wait for the authentication request from another radio communication device which has found the beacon signal. On the other hand, the other radio communication device which has received the beacon signal may only issue an authentication request immediately. In such a case, the radio communication device may perform the asynchronous communication without performing an always-awaiting operation to thereby operate a reception function with low power consumption.

A second preferred embodiment of the present invention includes a computer program described in computer readable form so that a process may be implemented on a computer system for performing wireless communication under a wireless communication environment where a plurality of wireless networks adjoin and their service areas overlap with one another, and the computer program includes: a notification step of notifying a radio communication device's existence in its service area; a terminal detection step of detecting another radio communication device's existence in the service area; and a connection management step of managing connection/non-connection with other radio communication devices whose existence has been found in a service area.

The computer program according to the second preferred embodiment of the present invention has the computer program described in computer readable form so as to implement the predetermined process on the computer systems is defined. In other words, by installing the computer program according to the second preferred embodiment of the present invention in the computer system, a collaborative operation is performed on the computer system, so that it suitably operates in the radio communication system according to the first preferred embodiment of the present invention, thus providing similar operations and an advantage that a wireless ad hoc network can be established among radio communication devices existing in the same space. In this case, adjoining ad hoc networks can coexist without being synchronized with the same frequency channel.

As it will be described in detail, according to the present embodiments of the present invention, a radio communication system, a radio communication device, a radio communication method, and a computer program for implementing the method can be provided in which communication terminals performing random access may not interfere one another with among networks under a communication environment where a plurality of ad hoc networks adjoin one another, so as to form a suitable radio network. In the wireless (radio) ad hoc network system according to the preferred embodiments of the present invention each radio communication device has the connection list for registering the communication devices with which the each radio communication device is connected, and the non-connection list for registering the communication devices with which it is not connected. The radio communication device grasps the existence of the surrounding radio communication devices by the predetermined method. When a new radio communication device exists, it performs the authentication verification operation with the new radio communication device. When the authentication is successful, the new radio communication device is registered in a neighboring connection list. If the authentication fails, it is registered in a neighboring non-connection list. Thus, the wireless ad hoc network can be established among the radio communication devices existing in the same space.

When the existing radio communication device disappears, the connection management can easily be performed by deleting it from the neighboring connection list and the neighboring non-connection list.

Alternatively, when the existing radio communication device disappears, it may only be deleted from the connection list and the reauthentication process may not be carried out with respect to a radio communication device written in the non-connection list.

By receiving the beacon signal from the radio communication device which is registered in the connection list, access control information can easily be exchanged with the connectable radio communication device.

BRIEF DESCRIPTION OF THE DRAWINGS

The above and other features and advantages of the present invention will become more apparent from the following description of the presently exemplary preferred embodiments of the present invention taken in conjunction with the accompanying drawings, in which:

FIG. 11 is a chart showing an operational sequence for performing deletion from the connection list and the non-connection list between the radio communication devices in the wireless ad hoc network according to a preferred embodiment of the present invention.

DESCRIPTION OF THE PREFERRED EMBODIMENTS OF THE PRESENT INVENTION

Referring to the attached drawings, preferred embodiments of the present invention will be described in detail in the following.

Figure 1:
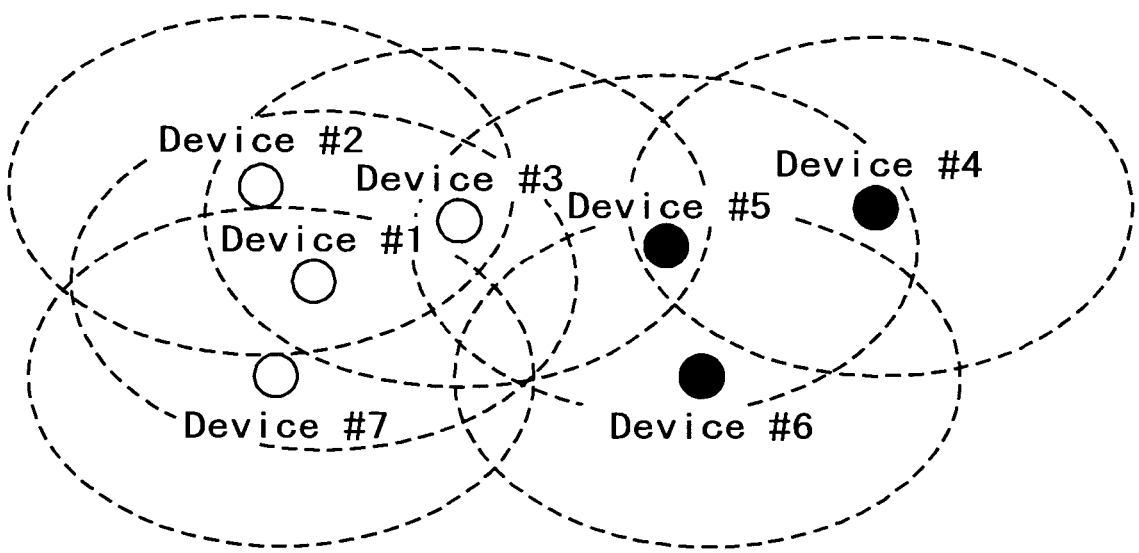
FIG. 1 is a schematic figure showing ad hoc networks according to a preferred embodiment of the present invention.

In FIG. 1 a structure of an ad hoc network according to a preferred embodiment of the present invention is schematically shown. In the preferred embodiment, seven radio communication devices can each constitute a network with a surrounding radio communication device.

According to the example as shown, a radio communication device (Device) #1 is in a state where direct communication is carried out with radio communication devices (Device) #2, #3, and #7. The radio communication device (Device) #2 is in a state where the direct communication can be carried out with the radio communication devices (Device) #1 and #3. The radio communication device (Device) #3 is in a state where the direct communication can be carried out with the radio communication devices (Device) #1, # 2, and #5. A radio communication device (Device) #4 is in a state where the direct communication can be carried out only with the radio communication device (Device) #5. The radio communication device (Device) #5 is in a state where the direct communication can be carried out with the radio communication devices (Device) #3, #4, and #6. The radio communication device (Device) #6 is in a state where the direct communication can be carried out only with the radio communication device (Device) #5. The radio communication device (Device) #7 is in a state where the direct communication can be carried out only with the radio communication device (Device) #1.

In the example as shown, the radio communication devices (Device) #1, #2, #3, and #7 indicated as a group A (white circles) are each set up so as to directly communicate with one another through the authentication process. Similarly, the radio communication devices (Device) #4, #5, #6 indicated as a group B (black solid circles) are each set up so as to directly communicate with one another through the authentication process.

Figure 2:
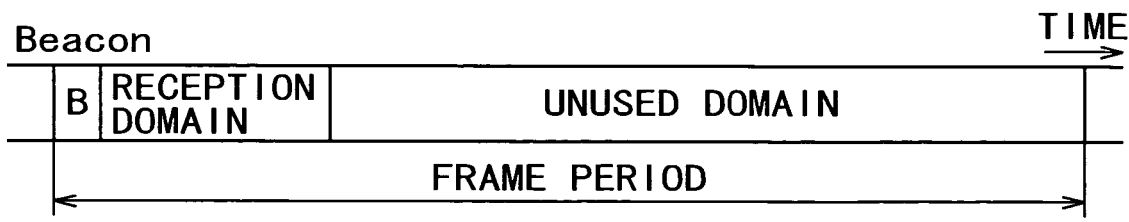
FIG. 2 is a schematic chart showing an example of communication frame structure used by a radio communication device which operates in a radio communication system according to a preferred embodiment of the present invention.

In FIG. 2 an example of communication frame structure which is used by the radio communication device which operates in the radio communication system according to the preferred embodiment of the present invention is schematically shown.

As shown in the figure, all radio communication devices have a common frame period, and sets up a timing of the frame period of its own by transmitting a heading beacon signal in the frame period.

A reception domain where the radio communication device performs reception operation is set up in the frame period. Further, according to an access control procedure written in the beacon signal, the access control in the reception domain or an unused domain is performed.

In the example as shown, the reception domain of a predetermined period is provided immediately after the beacon signal in the frame period so that the remaining of the frame period is set as an unused domain. Therefore, the radio communication device provides a reception domain immediately after notifying the existence of its own by transmitting the beacon signal, in order to wait for an authentication request from another radio communication device which found the beacon signal. On the other hand, the other radio communication device which received the beacon signal may perform an authentication request immediately. In such case, the radio communication device may perform the asynchronous communication without performing an always-awaiting operation, so that it becomes possible to operate the reception function with low power consumption.

In the radio communication system according to the preferred embodiment of the present invention, all radio communication device use the frame structure as shown in FIG. 2. Each radio communication device sets up the beacon transmission timing so as not to overlap that of a surrounding radio communication device, whereby the ad hoc network can be suitably established.

A certain radio communication device may carry out the continuous reception over the frame period, and grasp the existence of every surrounding radio communication device as a result of successful reception of the beacon signal.

Figure 3:
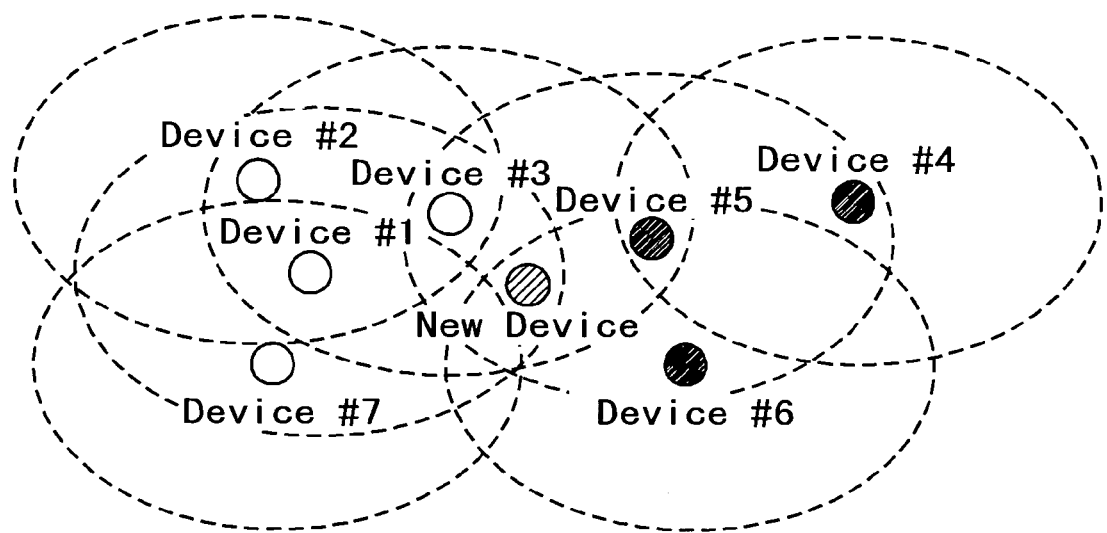
FIG. 3 is a schematic figure showing a situation where a new radio communication device (New Device) has entered a radio network system as shown in FIG. 1.

FIG. 3 illustrates a situation where a new radio communication device (New Device) has entered the radio network system as shown in FIG. 1. In the illustrated example, the new radio communication device (New Device #8) is assumed to be between the group A (white circles) and the group B (black solid circles).

At this time, the new radio communication device (New Device #8) performs the continuous reception operation over the predetermined frame period so as to receive the beacon signals from the surrounding radio communication devices (Device) #1, #3, #5, #6, and #7.

At this stage, the new radio communication device (New Device #8) sets up its own frame period at the timing which avoids the beacon signals of these surrounding radio communication devices (Device) so as to manage the radio network.

Then, the radio communication device (New Device #8) performs the predetermined authentication process with these surrounding radio communication devices (Device). For example, when it belongs to the group B (black solid circles), the radio communication devices (Device) #5 and #6 are written in (registered in) the connection list and the radio communication devices (Device) #1, #3, #7 are written in (registered in) the non-connection list.

Figure 4:
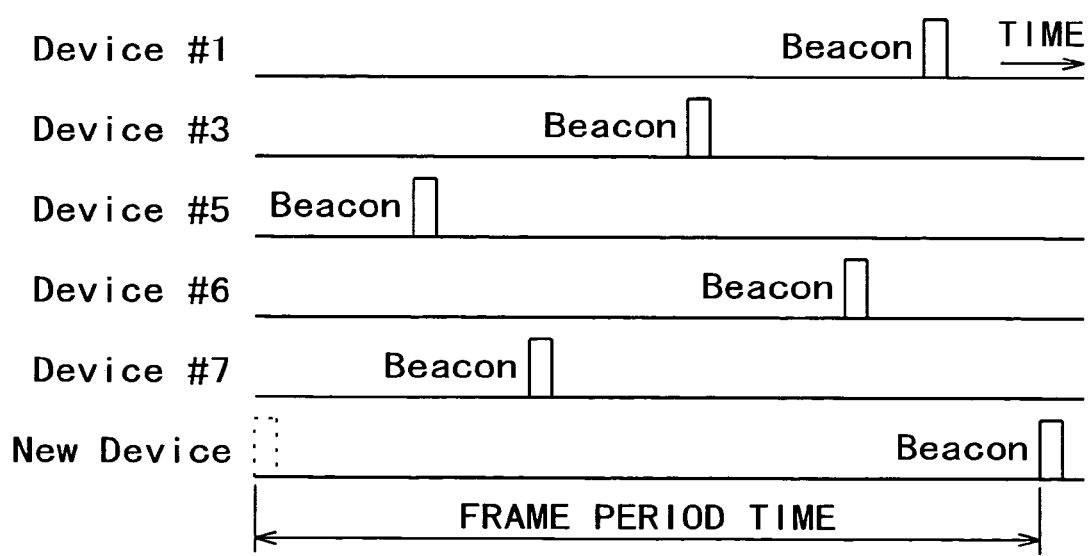
FIG. 4 is a chart showing an example of operation of a new radio communication device (New Device #8) receiving beacon signals from surrounding radio communication devices #1, #3, #5, #6, and #7 in the radio communication system as shown in FIG. 3.

FIG. 4 illustrates an example of operation of the new radio communication device (New Device #8) receiving the beacon signals from the surrounding radio communication devices #1, #3, #5, #6, and #7 in the radio communication system as shown in FIG. 3.

The illustrated example shows the way in which the newly entered radio communication device (New Device) performs the reception operation over the predetermined frame period so as to receive the beacon signals from the surrounding radio communication devices (Device).

Firstly, the frame period time is set up as a continuous receiving time from the head (rectangle in broken lines) of a frame period timing set up by the newly entered radio communication device (New Device).

The newly entered radio communication device (New Device) first receives the beacon signal from the radio communication device (Device) #5 during its reception operation. Subsequently, it receives the beacon signal from the radio communication device (Device) #7, further receives the beacon signal from the radio communication device (Device) #3, and still further receives the beacon signal from the radio communication device (Device) #6, and finally receives the beacon signal from the radio communication device (Device) #1.

According to such an operational procedure, the newly entered radio communication device (New Device) can find that the surrounding radio communication devices (Device) are #1, #3, #5, #6, and #7 and grasp (find, detect) each beacon transmission timing.

In the preferred embodiment of the present invention, the newly entered radio communication device (New Device) sets up its frame period and transmits the beacon so as to start an operation as a radio communication device.

The continuous reception (scanning) operation of the beacon signals as shown in FIG. 4 can be performed every few seconds, for example, so as to detect that a surrounding radio communication device has moved.

Figure 5:
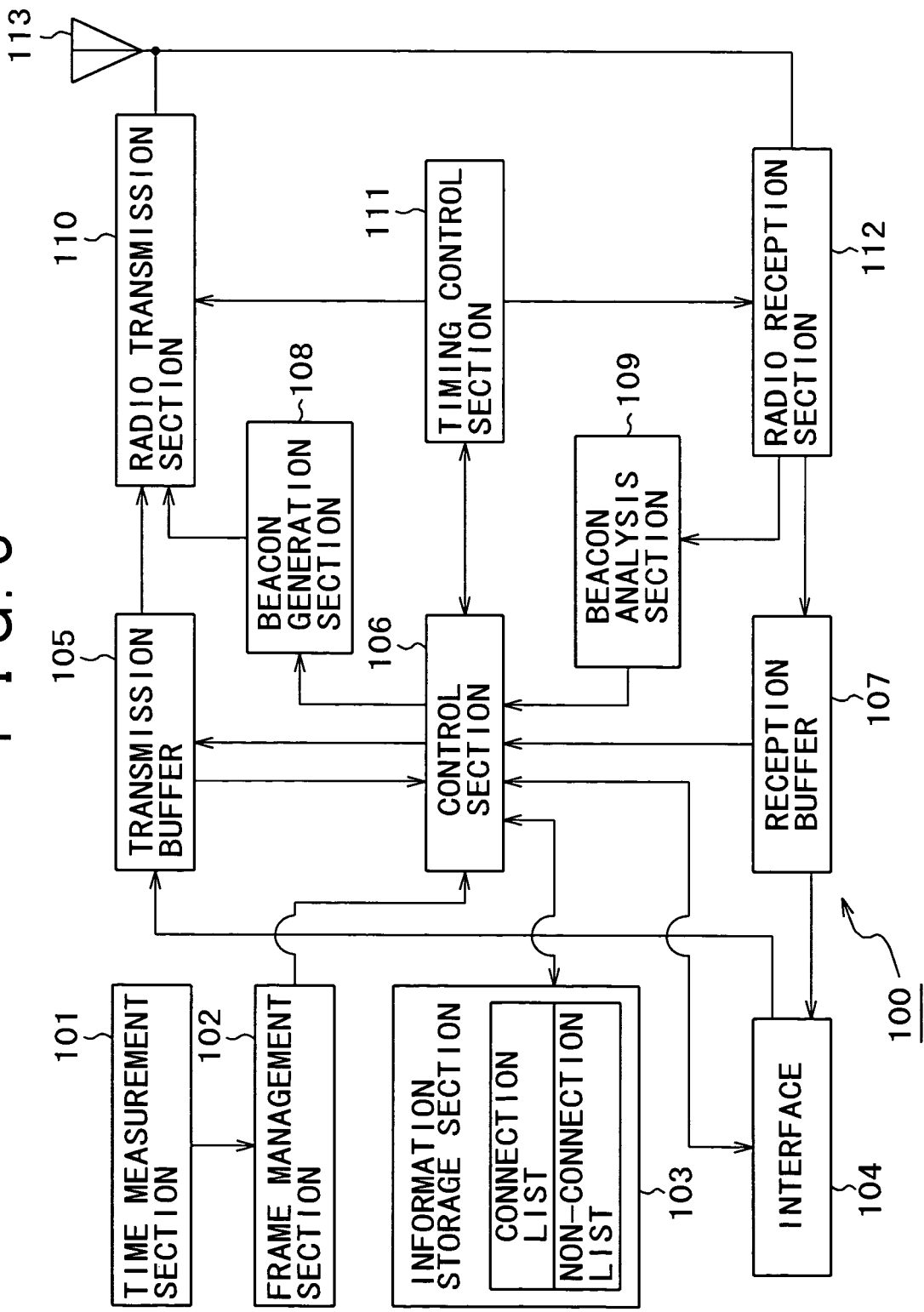
FIG. 5 is a block diagram for schematically illustrating functions and a structure of the radio communication device which can operate suitably in the radio communication system according to a preferred embodiment of the present invention.

FIG. 5 schematically shows functions and a structure of a radio communication device 100 which can operate suitably in the radio communication system according to a preferred embodiment of the present invention. As shown in the block diagram, the radio communication device 100 includes a time measurement section 101, a frame management section 102, an information storage section 103, an interface 104, a transmission buffer 105, a control section 106, a reception buffer 107, a beacon generation section 108, a beacon analysis section 109, a radio transmitting section 110, a timing control section 111, a radio reception section 112, and an antenna 113.

Under the general control of the control section 106, the communication device 100 can realize asynchronous wireless communication with another radio device. The central control section 106 is constituted by a microprocessor, for example, and controls operations of devices with respect to the wireless ad hoc network according to a preferred embodiment of the present invention in such a way so as to execute procedure instructions (program codes) stored in the information storage section 103.

The time measurement section 101 measures times as timing references to start device operations, such as a frame period and a scanning period. In the radio network system according to the preferred embodiment of the present invention, all radio communication devices use a common frame period and a common scanning period.

Based on the time measured in the time measurement section, the frame management section 102 sets up the frame period set up by this radio communication device and its start time and scanning period.

The information storage section 103 stores the procedure instructions (program codes) executed in the control section, and is used for storing information on other surrounding radio communication devices and information of the beacon transmission timing etc., the information being obtained as a result of having operated in the wireless ad hoc network according to the preferred embodiment of the present invention. Further, in the present preferred embodiment, the connection list and the non-connection list are stored which describes whether or not it should be connected with another radio communication devices within its own service area.

The interface 104 is an input/output terminal between an application device (not shown) to be connected to this radio communication device. The devices to be connected through the interface 104 may be information processing devices, such as a personal computer and a PDA (Personal Digital Assistant), for example. This type of information processing device is not equipped with a radio communication function originally. However, it may be connected with the radio communication device as shown in FIG. 5, so as to transmit, by radio, the data processed by the device itself and receive transmission information from another device.

The transmission buffer 105 is a memory for temporarily storing a transmission data. If there is information from the application device to be connected through the interface 104, in order to perform the radio transmission its transmission information is stored in the transmission buffer 105 and notified to the control section 106.

The control section 106 is equivalent to a main controller of the radio communication device 100, and issues instructions in an integrated manner to transmit and receive the management section beacon signal and to transmit and receive data information.

The timing control section 111 specifies the transmission timing and a timing to perform reception according to the instructions from the control section 106.

The radio transmitting section 110 takes transmission information, such as the beacon to be transmitted and transmission data, out of the transmission buffer 105, and performs modulation process with respect to the information so as to be converted into a radio transmission signal, which is emitted through the antenna 113 at a predetermined transmission timing specified by the timing control section 111.

The antenna 113 emits a radio signal into a transmission media (atmosphere), or receives a radio signal from the transmission media (atmosphere).

At a predetermined reception timing specified by the timing control section 111, the radio reception section 112 receives the beacon and a data signal sent from other radio communication devices through the antenna 113, and performs a demodulating process with respect to these, so as to convert them into a reception data and temporarily store them in the reception buffer 107.

When the information received by radio is information destined for the application device to be connected, it is taken out of the reception buffer 107 and transferred to the application device via the interface 104.

The beacon generation section 108 generates the beacon signal in which an identifier peculiar to the radio communication device and the access control information are described. The generated beacon signal is emitted through the radio transmitting section 110 and the antenna 113 at the predetermined beacon transmission timing specified by the timing control section 111.

The beacon analysis section 109 analyzes the beacon signal received through the antenna 113 and the radio reception section 112 at the predetermined reception timing specified by the timing control section so as to derive an identifier and a timing of a radio communication device of the transmitter.

In the preferred embodiment of the present invention, based on the scanning period, the frame period set up at the frame management section 102, and its start time, the control section 106 determines the beacon signal of its own, the transmission timing of the transmission data, the beacon signal from other radio communication devices, the reception timing of transmission data, etc. and instructs the timing control section 111 to control transmitting and receiving timings.

The control section 106 instructs the beacon generation section 108 to generate a beacon and further to analyze the beacon signal received from other radio communication devices within its own service area by means of a scanning process.

In addition, based on the beacon analysis results, the control section 106 performs connection management in its ad hoc network. What is meant by the connection management according to the preferred embodiment of the present invention is that a group of radio communication devices allowed to perform communications by means of a predetermined authentication process are registered in the connection list as the same group so as to identify an available radio communication device and a radio communication device which has not been allowed to perform communications is registered in the non-connection list as a different group. The connection list and the non-connection list are written in the information storage section 103.

Referring to the connection list and the non-connection list, the control section 106 maintains and manages a wireless communication network. In particular, before the predetermined authentication process, the radio communication device transmits the beacon signal at the head of the frame period of its own in order to find a radio communication device existing within its own service area. Further, it performs a continuous reception process of a frame period at the predetermined period so as to find a surrounding radio communication device. The radio communication devices in the same group registered in the connection list perform the access control based on mutual beacon signals so as to perform the data transmission. On the other hand, the radio communication devices registered in the non-connection list mutually receive the beacon signals to avoid a disturbance of the access control, so as to perform neither the data communication nor the authentication process for the second time.

Operations performed in the wireless ad hoc network system of radio communication devices 100 as shown in FIG. 5 will be described as a preferred embodiment of the present invention.

When entering the wireless ad hoc network system and beginning operation, or when it is the scanning period of continuous reception operation set up at a subsequent predetermined period, the frame management section 102 receives a notice from the time measurement section 101 and notifies the control section 106 that the whole frame region is available for reception. The control section 106 further instructs the timing control section 111 to cause the radio reception section 112 to operate over a predetermined time.

The beacon signal received by the radio reception section 112 is analyzed by the beacon analysis section 109, so that an identifier of the radio communication device and a receiving timing of the beacon, etc. are notified to the control section 106.

The control section 106 applies the timing information from each of the communication devices to the frame period of its own, and stores it in the information storage section 103 as timing information on the communication devices existing around itself.

When it is a beacon from a newly entered communication device, the control section 106 instructs transmission of a predetermined authentication request command. When an authentication completion command is received from the newly entered device within a predetermined time, the communication device is registered in the information storage section 103 as a connection list. If the authentication completion command is not received, the communication device is registered in the information storage section 103 as a non-connection list, as if authentication for inclusion in the same network has not been obtained.

Based on the thus collected information, the control section 106 first sets up the frame period of its own.

When the beacon is transmitted in accordance with the frame period, the beacon generation section 108 generates information about the identifier of the radio communication device and the access control as the beacon signal, the information being written in the beacon of its own, according to instructions from the control section 106. When it is the timing of the head of the frame, the timing control section 111 sends instructions to carry out the radio transmission through the control section 106 to the radio transmitting section 110. In response to this, the beacon signal is transmitted through the antenna 113 from the radio transmitting section 110.

When performing the data transmission, a data transmission request is first received by the transmission buffer 105 through the interface 104, and notification is performed including information on the data destination.

The control section 106 refers to the presence of beacon information received from the radio communication device as the destination through the information storage section 103, and based on the beacon information, it further refers to a setup of the timing by which the radio communication device as the destination performs reception, so as to send the timing setup to the timing control section 111.

When the predetermined set-up timing arrives, the timing control section 111 sends instructions to perform the radio transmission to the radio transmitting section 110. In response to this, the data is transmitted through the antenna 113 from the radio transmitting section 110.

In the case where data reception is performed, then if the receiving timing set up by the radio communication device arrives, the receiving timing is notified from the control section 106 to the timing control section 111 so that the radio reception section 112 is operated at the receiving timing.

The data signal received in the radio reception section 112 at this receiving timing is once stored in the reception buffer 107. When certain data are correctly collected, the data are sent to the application device connected to the radio communication device 100 through the interface 104 at the predetermined timing.

In addition, when entering a new network and receiving authentication request command from another radio communication device, the fact is notified to the control section 106 through the reception buffer 107. It is then notified to the application device through the interface 104 from the control section 106. On the application device, a screen is displayed to show that the authentication has been requested so as to verify to see whether the user desires the authentication. Then, an input for the completion of authentication is notified to the control section 106 through the interface 104, as a result of instruction by the user,.

At this stage, when the user input for completing the authentication is carried out on the application device, the control section 106 sets up the authentication completion command at the transmission buffer 105, and performs predetermined access control so as to send a response to the radio communication device as a transmitter of the authentication request.

Figure 6:
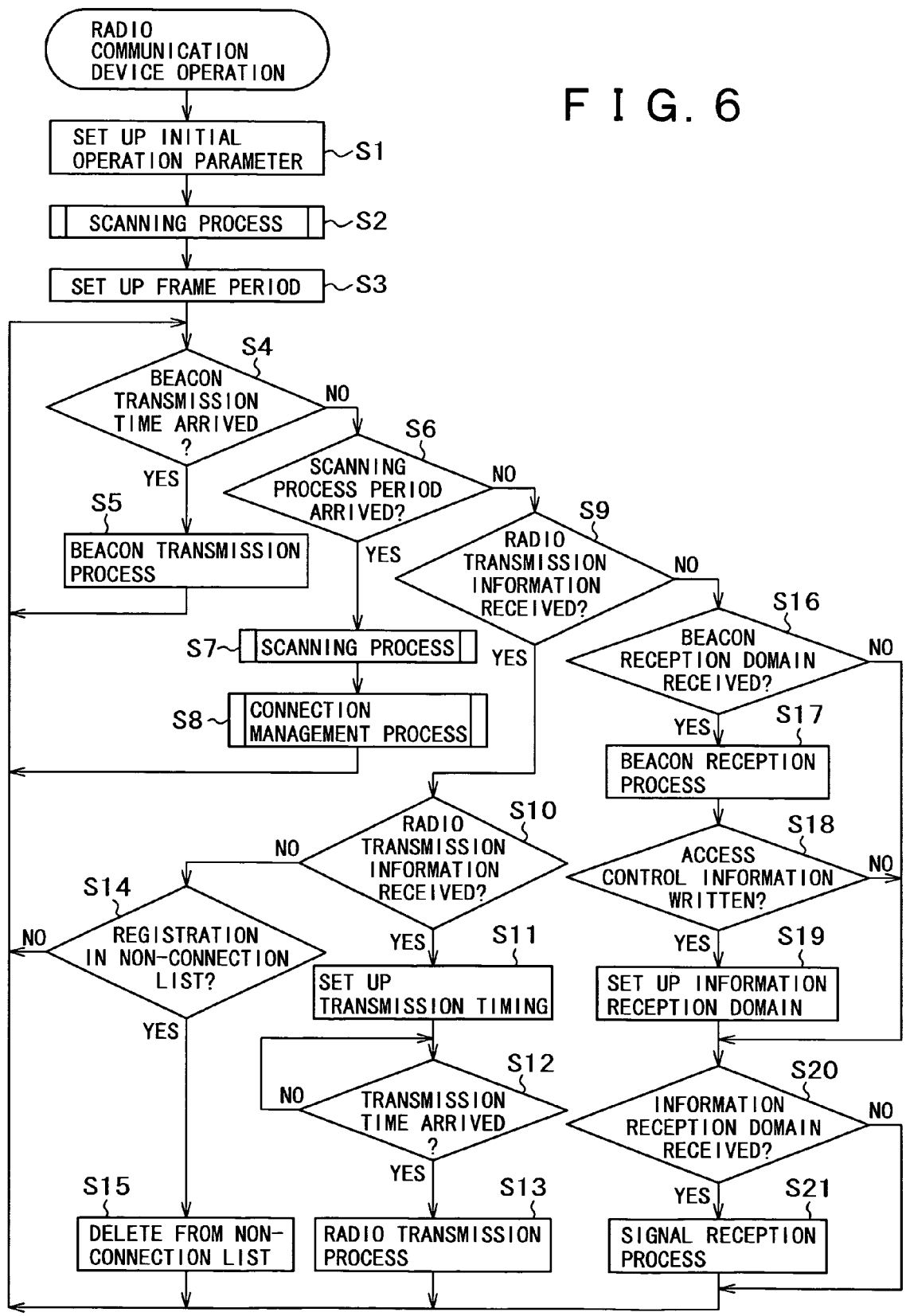
FIG. 6 is a flowchart showing a procedure performed on a radio communication device 100 as shown in FIG. 5.

FIG. 6 shows, in a flowchart form, a procedure performed on the radio communication device 100 as shown in FIG. 5.

After turning on a power supply of the device 100, a so-called initial operation parameter is set up, in step S1 by reading MAC (Machine Access Control) address information of its own etc., setting up an operating time of scanning process, and setting up a scanning process period, for example.

Then, the scanning process is performed for acquiring the beacon signal transmitted from another radio communication device existing in its own service area, in step S2. The scanning process will be described in detail later.

Then, based on the result of scanning process, in a different position from the beacon transmission timing of the surrounding radio communication device, the frame period is set so as to transmit its beacon, in step S3, and operation is performed as a radio communication device in the wireless ad hoc network.

At a later time when the set-up beacon transmission timing arrives, in step S4, a transmission process of the beacon signal is performed, in step S5, then the process returns to step S4 and continues a series of operations.

In the case where it has not been the beacon transmission timing, in step S4, then when the scanning process period arrives, in step S6, the scanning process is performed, in step S7. After the scanning process, according to the beacon signal acquired from the surrounding radio communication device, a connection management process as a network is performed, in step S8. Subsequently, the process returns to step S4 and continues the series of operations.

When it has not been the scanning process timing, in step S6, it further verify whether or not radio transmission information has been received from the application device through the interface 101, in step S9. When the radio transmission information is received, it is verified whether or not the radio communication device as a destination of the information is registered in the connection list, in step S10. When it is registered in the connection list, a transmission timing destined for the radio communication device is set up, in step S11. More particularly, as can be seen from the frame structure as shown in FIG. 2, since the reception domain exists after transmitting the beacon signal, the setup is carried out so that the transmission may be performed by means of the domain. When the transmission timing arrives, in step S12, an information transmission process is performed, in step S13. Then, the process returns to step S4 and continues the series of operations.

In addition, when the radio communication device as the destination of the information is not registered in the connection list, in step S10, it is further verified whether or not the radio communication device as the destination of the information is registered in the non-connection list, in step S14. When it is registered in the non-connection list, since the application device requests transmission (i.e. connection) of the radio transmission information, the radio communication device is deleted from the non-connection list, in step S15. Subsequently, the process returns to step S4 and continues the series of operations. If it is not registered in the non-connection list, skipping the deletion process, the process returns to step S4 and continues the series of operation.

Also, when a beacon reception domain written in the connection list arrives, in step S16, a beacon reception process is performed, in step S17. The radio communication device 100 sets up an information reception domain, in step S19 when the access control information destined for itself is written, in step S18.

Alternatively, when it is not the beacon reception domain, in step S16, and when the access control information is not written, in step S18, the process moves to step S20.

When the reception domain set up by the device itself arrives, in step S20, a signal reception process is performed, in step S21. Then, the process returns to step S4 and continues the series of operations.

Figure 7:
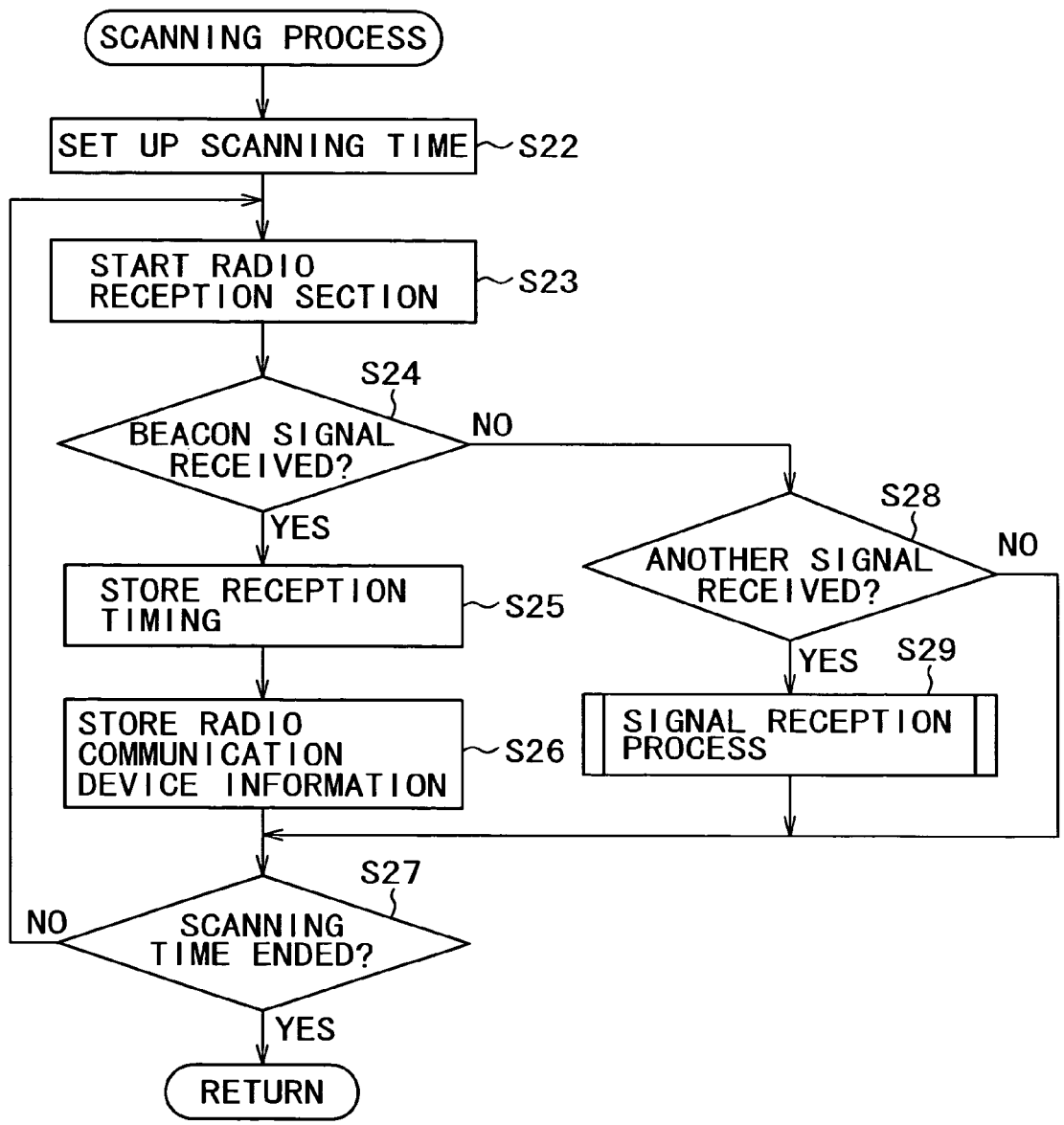
FIG. 7 is a flowchart showing a procedure of a scanning process for acquiring the beacon signal transmitted from another radio communication device existing within a service area of the radio communication device 100.

FIG. 7 shows a procedure of the scanning process, in a flowchart form, which is performed in step S2 and step S7 in the flowchart as shown in FIG. 6 in order to acquire the beacon signal transmitted from another radio communication device existing within the service area of the radio communication device 100.

Firstly, a scanning time is set up, in step S22. This scanning time may be set up as the same as the time of the frame period.

In addition, the radio reception section 112 is started, in step S23 so as to perform the reception process of a radio signal. At this time, if the beacon signal is received, in step S24, its reception timing is stored, in step S25. The beacon analysis section 109 analyzes the beacon information, and stores information peculiar to the radio communication device of the beacon signal transmitter, in step S26.

Subsequently, it is determined whether or not the scanning time has elapsed, in step S27. If the scanning time has not elapsed, the process returns to step S23 and performs the next beacon reception process. When the scanning time elapses, the series of processes end.

In step S24, when a signal other than the beacon signal is received, in step S28, the signal reception process of the signal is performed, in step S29. Then, it is determined whether or not the scanning time has elapsed, in step S27. If the scanning time has not elapsed, the process returns to step S23 and performs the next beacon reception process. When the scanning time elapses, the series of processes end.

Based on the result of scanning process, the radio communication device sets up the frame period so that the beacon of the device itself may be transmitted in a different position from the beacon transmission timings of the surrounding radio communication devices. According to the beacon signals acquired from the surrounding radio communication devices, the connection management process as a network is performed.

Figure 8:
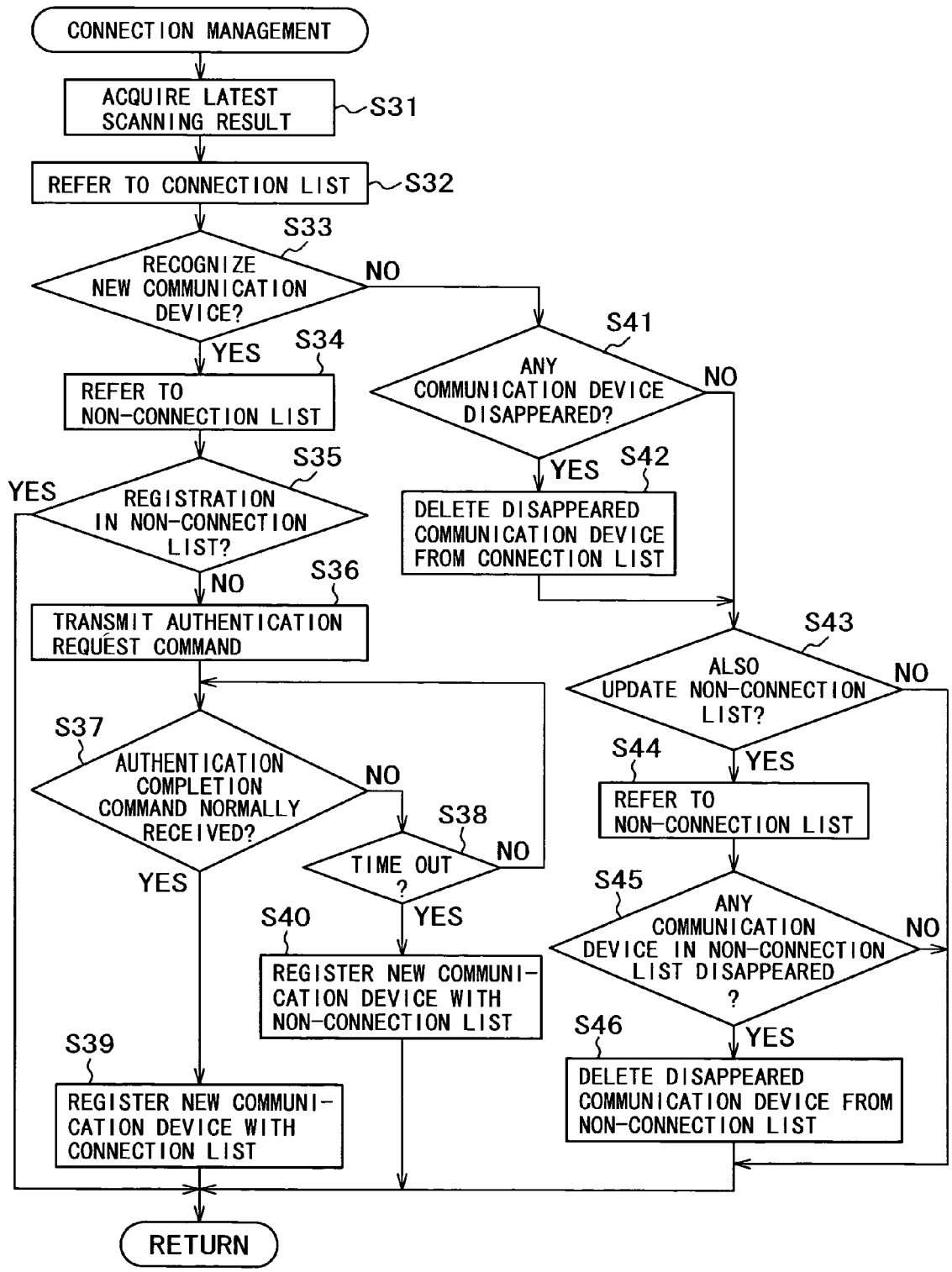
FIG. 8 is a flowchart showing a procedure of a network connection management process performed in step S8 of the flowchart as shown in FIG. 6.

FIG. 8 shows in flowchart form, a process of network connection management process performed in step S8 of the flowchart as shown in FIG. 6.

First, while acquiring the result of the latest scanning process, in step S31, the connection list is referred to, in step S32.

Then, the information data are compared and it is checked to see whether or not a new communication device is recognized in the scanning result, in step S33. At this stage, when a new communication device which has not been registered in the connection list is recognized, the non-connection list is further referred to, in step S34, and it is checked to see whether or not the new communication device has been registered in the non-connection list, in step S35.

At this stage, when the new communication device is not registered in the connection list but registered in the non-connection list, the authentication operation is not performed but skipped.

Thus, the beacon signals are mutually received among other groups registered in the non-connection list, so that disturbances to access control may be avoided and neither data communication nor a re-authentication process is carried out. The radio communication devices of different groups do not communicate with one another, even if they recognize one another, whereby mutual interferences are avoided among different wireless ad hoc networks.

On the other hand, if the newly recognized communication device is not registered either with the connection list or with the non-connection list, in step S35, the authentication request command is transmitted to the communication device, in step S36.

Subsequently, if the authentication completion command is normally received within the predetermined time from the new radio communication device, in step S37, it is considered that the radio communication device has authenticated as belonging to the same group, so that it is registered in the connection list, in step S39 and the connection management process is ended.

On the other hand, if the authentication completion command is not normally received within the predetermined time, in step S38, it is considered that the radio communication device has not authenticated as belonging to the same group, so that it is registered in the non-connection list, in step S40 and the connection management process is ended.

In step S33, when it is determined that a new communication device is not recognized in the scanning result, it is further determined whether or not a communication device has disappeared from the communication devices written in the existing connection list, in step S41. If there is a disappeared communication device, the radio communication device is deleted from the connection list, in step S42.

Further, it is determined whether it is necessary to update the non-connection list, in step S43. If it is necessary to update the non-connection list, the non-connection list is referred to, in step S44 and it is determined whether or not there is a communication device disappeared from the communication devices written in the existing non-connection list, in step S45. If there is a disappeared communication device, the radio communication device is deleted from the non-connection list, in step S46.

As described above, when an existing radio communication device disappears from the service area, the connection management can be easily performed by deleting the existing radio communication device from the connection list and the non-connection list.

On the other hand, when it is not necessary to update the non-connection list, in step S43, and even if the communication device in the non-connection list has disappeared, the connection management process may be ended as it is. When the existing radio communication device disappears, it is not necessary to perform the re-authentication process with the radio communication device written in the non-connection list, by deleting it only from the connection list.

Figure 9:
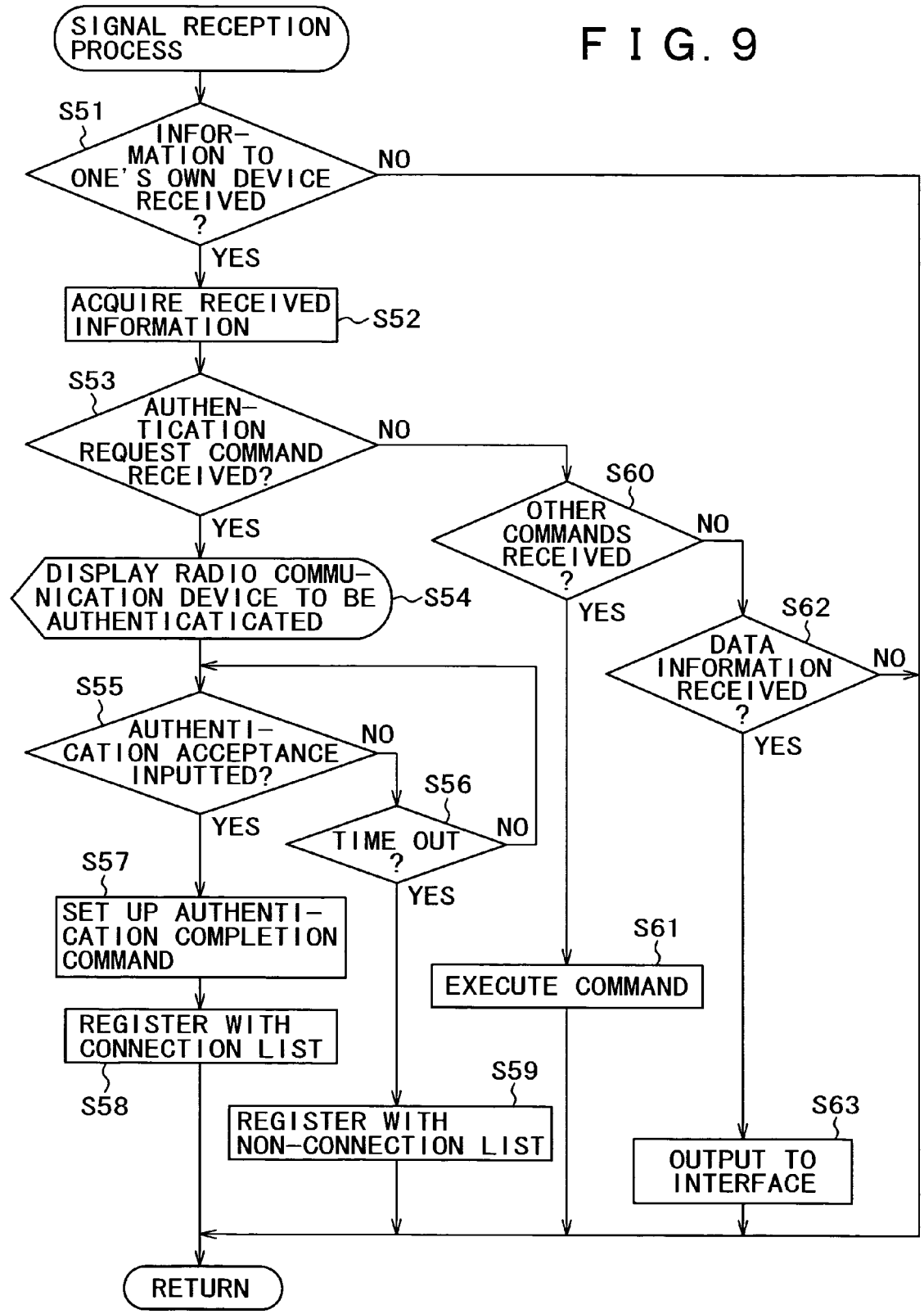
FIG. 9 is a flowchart showing a procedure of a signal reception process.

FIG. 9 shows a procedure, in a flowchart form, of the signal reception process performed in step S21 of the flowchart as shown in FIG. 6 and in step S29 of the flowchart as shown in FIG. 7.

The radio communication device performs the reception process in the reception domain within the frame period of its own (see FIG. 2). At this stage, when there is information reception destined for the device itself, in step S51, the received information is acquired, in step S52.

At this stage, when the received information is the authentication request command, in step S53, which is notified to the application device through the interface 104. On the application device, the radio communication device to be authenticated is displayed, and it is checked to see whether or not the user desires the authentication of the radio communication device of a requester, in step S54. When an input operation to accept the authentication is carried out by the user within the predetermined time, in step S55, the authentication completion command is set up as the transmission information, in step S57. The authentication completion command is transmitted by means of the reception domain of the radio communication device of the authentication requester, for example. Then, the radio communication device is registered in the connection list, in step S58, and the series of processes end.

When any input operation to accept the authentication is not performed by the user within the predetermined time or when an input operation to refuse the authentication is carried out, in step S56, the radio communication device is registered in the non-connection list, in step S59 and the series of processes end.

When a command other than the authentication request command is received, in step S60, a process specified as the command is performed, in step S61, and the series of processes end.

When data information is received, in step S62, the information is outputted to the application device via the interface 104 of the radio communication device, in step S63 and the series of processes end.

When there is no reception destined for the device itself and when it is not reception of data information, in step S62 within a specified time for the signal reception process, in step S51, the series of processes end.

Figure 10:
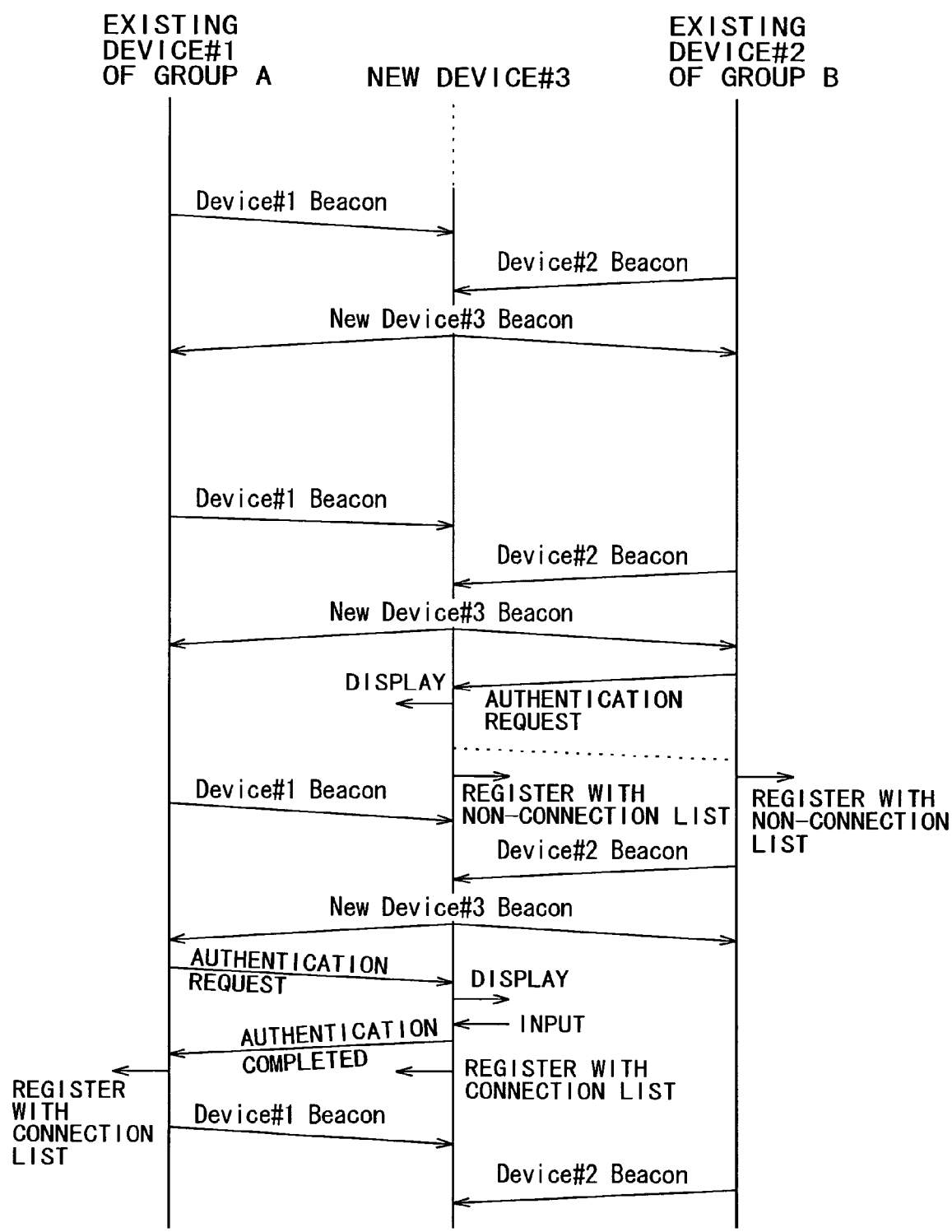
FIG. 10 is a chart showing an operation sequence for performing registration in a connection list and a non-connection list between radio communication devices in a wireless ad hoc network according to a preferred embodiment of the present invention.

FIG. 10 shows an operation sequence for performing registration in the connection list and the non-connection list between radio communication devices in the wireless ad hoc network according to a preferred embodiment of the present invention.

In the example as shown in the chart, under the wireless communication environment where there are the existing communication device #1 belonging to the group A and the existing communication device #2 belonging to the group B, the sequence is illustrated when the new communication device #3 which is not registered in either of the groups starts operation.

The new communication device #3 performs the reception operation before transmitting a beacon #3 of its own. As a result, the beacons are received from both the existing communication device #1 and the communication device #2. According to these beacon information data, the beacon transmission timing is set to a timing to avoid a collision and the beacon of the communication device #3 is transmitted.

On recognizing the beacon of the communication device #3, the communication device #2 transmits the authentication request to the communication device #3. On the other hand, after receiving the authentication request, the communication device #3 displays the authentication request so as to prompt the user to determine whether or not to authenticate the communication device #2.

At this stage, if the user does not perform an input operation to accept the authentication in the communication device #3 until the predetermined time elapses, the authentication request of communication device #2 times out. As a result, a relationship between communication device #2 and communication device #3 is not authenticated, so that each communication device registers its partner with the non-connection list.

Then, it is assumed that, after repeating a series of beacon communication operations, the communication device #1 also recognizes the beacon of the communication device #3. The communication device #1 transmits the authentication request command to the communication device #3. On the other hand, if the authentication request is received, the communication device #3 displays the authentication request so as to prompt the user to determine whether or not to authenticate the communication device #1.

At this stage, if the user performs the input operation to accept the authentication in communication device #3 before the predetermined time elapses, the communication device #3 returns the authentication completion command to the communication device #1 and registers the communication device #1 with the connection list of its own. Having received the authentication completion command, the communication device #1 also registers the communication device #3 with the connection list of its own.

According to the sequence of operations as described above, the fact that the communication device #1 and the communication device #3 are in the connection relationship and the fact that the communication device #2 and the communication device #3 are in the non-connection relationship are registered in respective communication devices. Then, although the series of beacon communication operations are repeated, the communication device #2 and the communication device #3 which are in the non-connection relationship mutually receive the beacon signals and avoid the interference to the access control, however without performing either the data communication or the reauthentication process, whereby the mutual interferences among the different wireless ad hoc networks can be avoided.

Further, in the example as shown in FIG. 10, a case is shown where communication device #3 newly enters, and a similar sequence can be applied to a case where the existing communication device #3 moves between the existing communication devices #1 and #2.

FIG. 11 shows an operational sequence for performing deletion from the connection list and the non-connection list between the radio communication devices in the wireless ad hoc network according to the preferred embodiment of the present invention.

The example as shown in the figure illustrates a sequence where there are the existing communication device #1 belonging to the group A and the existing communication device #2 belonging to the group B exist, between which the communication device #3 registered in the group A moves and then leaves.

First, it is assumed that the communication device #1, the communication device #2, and the communication device #3 each transmit the beacon at the predetermined timing so as to employ the ad hoc network. It is assumed that at this time, the communication device #3 for example moves, so that it cannot recognize either of the beacons of the communication device #1 and communication device #2.

On becoming unable to detect the beacon of the communication device #1, the communication device #3 deletes the communication device #1 registered as a connection link from the list. Having become unable to detect the beacon of communication device #3, the communication device #1 deletes the communication device #3 registered as a connection link from the list.

Further, on becoming unable to detect the beacon of communication device #2, the communication device #3 deletes the communication device #2 registered as a non-connection link from the list, only if the non-connection link information also needs to be updated. Having become unable to detect the beacon of the communication device #3, the communication device #2 also deletes the communication device #3 registered as the non-connection link from the list, only if the non-connection link information also needs to be updated.

The preferred embodiments of the present invention may have a configuration in which the above-described sequence of operations may be conveniently started if it is detected that the beacon has become unable for reception by means of a periodic beacon reception operation,.

Furthermore, the present invention has been described in detail with reference to specific preferred embodiments thereof. However, it should be obvious to those skilled in the art that any modifications, variations, combination and sub-combinations may be applied to the embodiments without departing from the scope of the present invention. In other words, the present invention has been disclosed by way of examples, so that the description should not be construed as limiting the scope thereof.

What is claimed is:

1. A radio communication device for operation in a radio communication environment in which a plurality of adjacent radio networks having overlapping service areas, said radio communication device comprising:
   communication means for communicating radio data;
   control means for controlling radio data communication by said communication means;
   notification means for notifying an existence within a service area of said communication means;
   terminal detection means for detecting existence of another radio communication device within said service area of said communication means; and
   connection management means for managing connection/non-connection of said other radio communication device detected within said service area, wherein said radio communication environment further comprises an adjacent ad-hoc radio network to which each radio communication device performs direct asynchronous ad-hoc communication without using a communication device as a control station.

2. The radio communication device according to claim 1, wherein said connection management means performs authentication verification of a radio communication device detected by said terminal detecting means and registers said radio communication device in said connection list authentication is successful, and registers said radio communication device in said non-connection list when authentication is unsuccessful.

3. The radio communication device according to claim 2, wherein said connection management means determines an existence of an authorization for authentication after performing authentication of a user, when receiving an authentication request command from another radio communication device.

4. The radio communication device according to claim 2, wherein said connection management means erases from said connection list a radio communication device whose existence is not detected by said terminal detecting means during a period of time exceeding a predetermined time limit.

5. The radio communication device according to claim 2, wherein said connection management means erases from said non-connection list a radio communication device whose existence is not detected by said terminal detecting means during a period of time exceeding a predetermined time limit.

6. The radio communication device according to claim 1, wherein said connection management means performs authentication verification of an apparatus among radio communication devices detected by said terminal detecting means which has no registration in both said connection list and said non-connection list, but does not perform authentication verification of an apparatus already registered in said non-connection list.

7. The radio communication device according to claim 1, wherein said connection management means transmits an authentication request command to a radio communication device for registration in said connection list and registers said radio communication device in said connection list; and transmits an authentication completion command when receiving and authorizing authentication of an authentication request command from another radio communication device.

8. The radio communication device according to claim 1, wherein said control means sets a reception domain of predetermined duration within said frame period after said beacon signal, and a remaining portion of said frame period is set as an unused domain.

9. A radio communication method for radio communication in a radio communication environment in which a plurality of adjacent radio networks having overlapping service areas, said radio communication method comprising:
   notifying an existence of a radio communication device within its service area;
   detecting existence of another radio communication device within said service area;
   managing connection/non-connection of said other radio communication device detected within said service area;
   performing authentication verification of the radio communication device detected in said terminal detecting step;
   registering said radio communication device in a connection list when authentication is successful; and
   registering said radio communication device in a non-connection list when authentication is unsuccessful.

10. The radio communication method according to claim 9, wherein said connection management step performs authentication verification of an apparatus among radio communication devices detected in said terminal detecting step which has no registration in both said connection list and said non-connection list, but does not perform authentication verification of an apparatus already registered in said non-connection list.

11. The radio communication method according to claim 9, wherein said connection management step further comprises the steps of:
   transmitting an authentication request command to a radio communication device for registration in said connection list; and
   registering said radio communication device in said connection list and transmiting an authentication completion command upon receipt of an authentication request command from another radio communication device.

12. The radio communication method according to claim 9, wherein said connection management step determines existence of authorization for authentication after performing authentication of a user, when receiving an authentication request command from another radio communication device.

13. The radio communication method according to claim 9, wherein said connection management step erases from said connection list a radio communication device whose existence is not detected in said terminal detecting step during a period of time exceeding a predetermined time limit.

14. The radio communication method according to claim 9, wherein said connection management step erases from said non-connection list a radio communication device whose existence is not detected in said terminal detecting step during a period of time exceeding a predetermined time limit.

15. A radio communication device, comprising
   a transmitter for communicating radio data;
   a microprocessor for controlling communication of radio data by the transmitter;
   a signal generator for generating a first beacon signal having a predetermining frame period for transmission by the transmitter the beacon signal notifying one or more other radio communication devices within a service area of the transmitter;
   a receiver for detecting the one or more other radio communication devices within the service area of the transmitter; and
   an information storage unit storing connection management information associated with the one or more other radio communication devices detected within the service area, and
   wherein the microprocessor is operable to authenticate one of the one or more other radio communication devices detected by the receiver and register the one of the one or more other radio communication devices as part of the connection management information of authentication is successful.

16. The radio communication device of claim 15, wherein the connection management information comprises one or more connection lists associated with the one or more other communication devices.

17. The radio communication device of claim 15, wherein the connection management information comprises one or more non-connection lists associated with the one or more other communication devices.

18. The radio communication device of claim 15, wherein the information storage unit stores instructions that are executed by the microprocessor.

19. A method for communicating in a radio communication environment including a plurality of adjacent radio networks having overlapping service areas, the method comprising:
   providing, by a first radio device, notification information indicating the radio devices s presence in a first service area associated with one of the adjacent radio networks;
   managing connection of the second radio device detected in the first service area;
   sending an authentication request command to the second radio device; and
   registering the second radio device in a connection list associated with the first radio device if an authentication completion message is received from the second radio device.

* * * * *